March 25, 1924.  1,488,155

B. W. KADEL

BRAKE WHEEL

Filed May 3, 1922  2 Sheets-Sheet 1

INVENTOR.
Byrus W. Kadel
BY
his ATTORNEY.

March 25, 1924.
B. W. KADEL
BRAKE WHEEL
Filed May 3, 1922
1,488,155
2 Sheets-Sheet 2
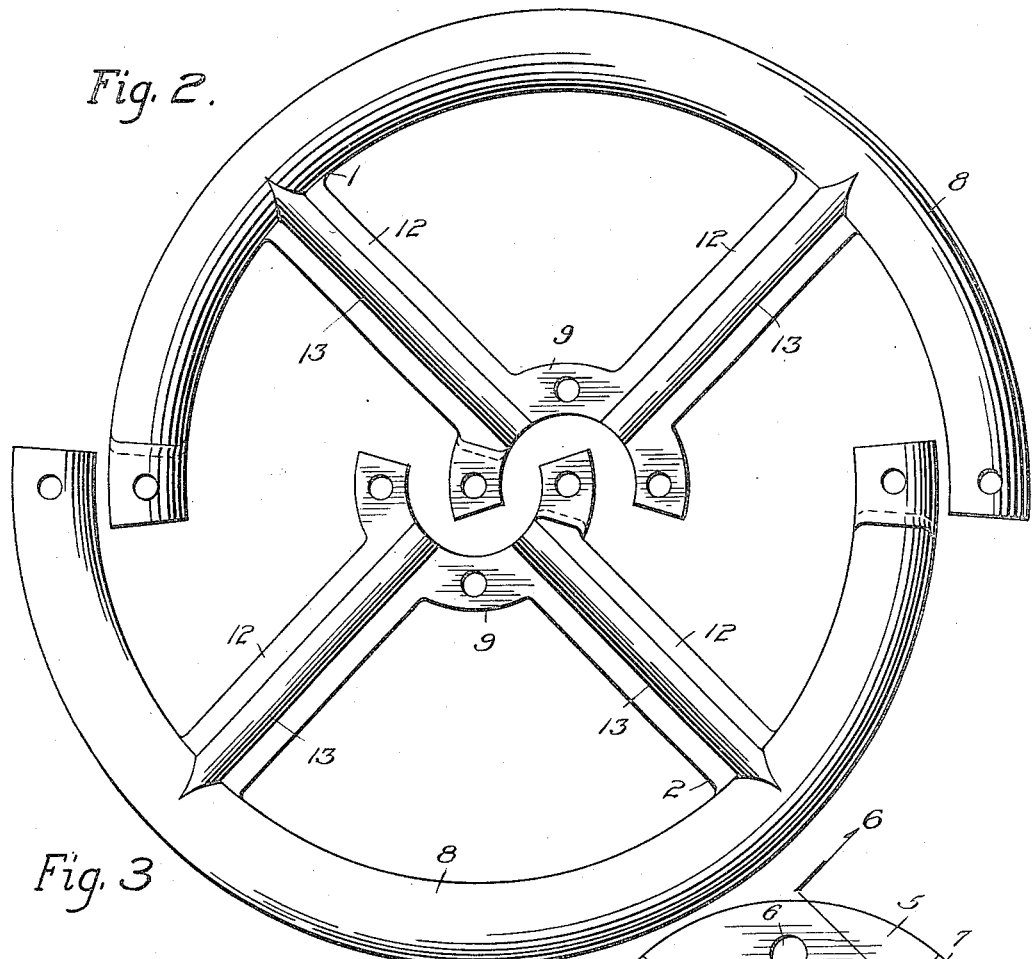
Fig. 2.
Fig. 3.
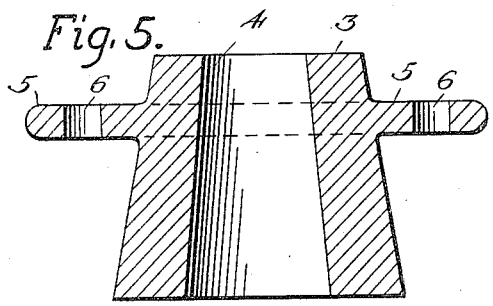
Fig. 5.
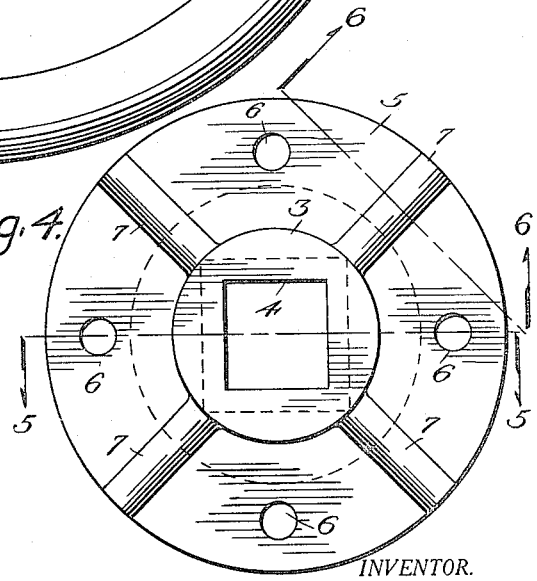
Fig. 4.
INVENTOR.
Byron W. Kadel
BY
his ATTORNEY.

Patented Mar. 25, 1924.

1,488,155

UNITED STATES PATENT OFFICE.

BYERS W. KADEL, OF BALTIMORE, MARYLAND, ASSIGNOR TO THE T. H. SYMINGTON COMPANY, OF NEW YORK, N. Y., A CORPORATION OF DELAWARE.

BRAKE WHEEL.

Application filed May 3, 1922. Serial No. 558,236.

*To all whom it may concern:*

Be it known that I, BYERS W. KADEL, a citizen of the United States, residing at Baltimore, in the State of Maryland, have invented certain new and useful Improvements in Brake Wheels; and I do hereby declare the following to be a full, clear, and exact description of the invention, such as will enable others skilled in the art to which it appertains to make and use the same.

This invention relates to hand brake wheels, and, more particularly stated, resides in the production of a pressed metal hand wheel adapted to be connected to the brake shaft of railway cars for applying the brakes by hand.

The present invention has for an object the provision of a strong, durable and inexpensively manufactured hand wheel of relatively light weight and maximum strength value.

Another object of the invention is to provide a pressed metal hand brake wheel formed of either a single disk or complementary sections, each of which latter is formed with inner and outer rim portions connected by reinforced spoke members, said inner rim portions and spoke members being interconnected with a hub section in such a manner as to materially reduce the shear strains upon the rivets connecting the inner rim portions to the hub, when the wheel is turned under the resisting strains of applying the brakes.

With these and other objects in view the invention further consists in the construction and arrangement of the parts hereinafter described and pointed out in the claims.

In the accompanying drawings wherein I have illustrated an embodiment of my invention:

Figures 2 and 3 are plan views of complementary sections forming the wheel, each section comprising each view being shown detached.

Figure 4 is a top plan view of the hub member adapted to fit the upper end of a brake shaft.

Figure 5 is a vertical sectional view through the hub member on the line 5—5 of Figure 4.

Figure 1:
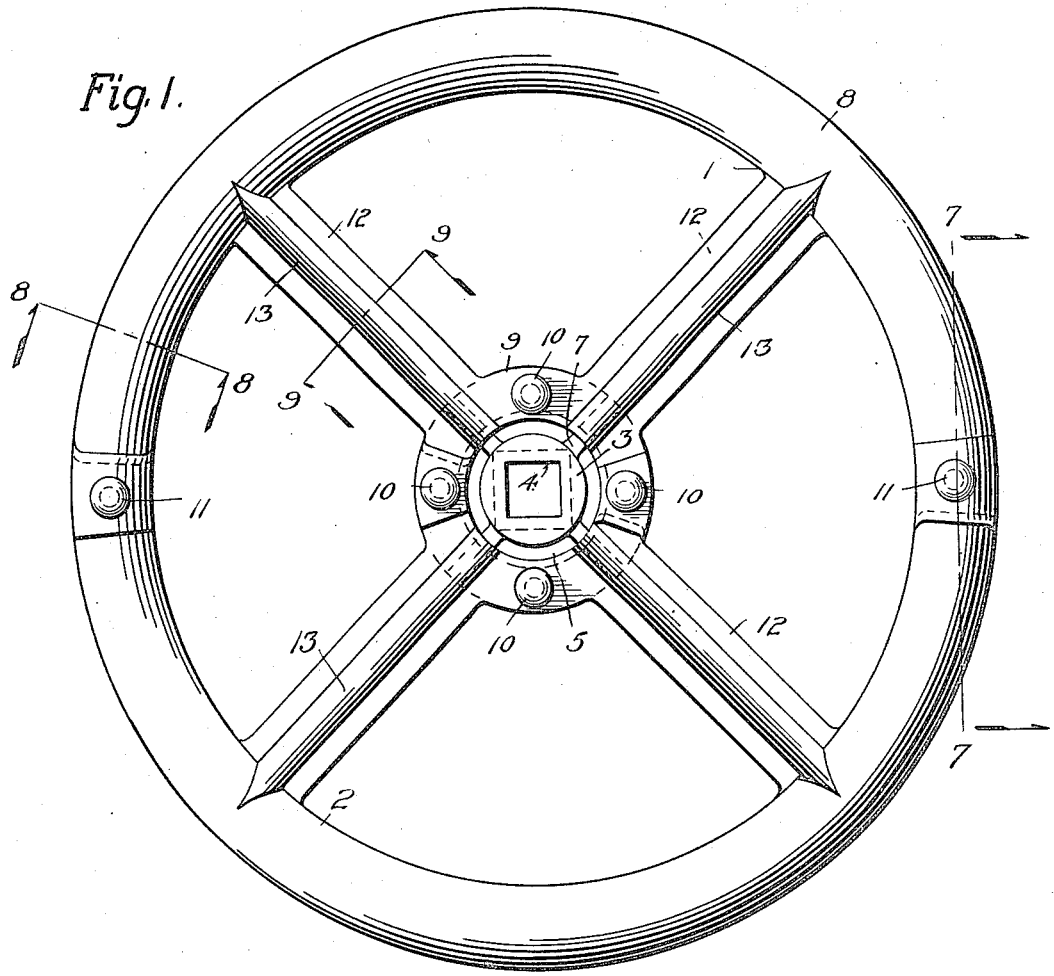
Figure 1 is a top plan view of a hand brake wheel constructed in accordance with my invention.

Referring to the drawings wherein corresponding reference characters designate similar parts in the several views, my improved hand brake wheel is shown as formed of two complementary sections 1 and 2 adapted to be connected to each other, and to a wheel hub member 3, the latter fitting the upper end of the usual railway car brake shaft, not shown.

The wheel hub member 3 is preferably a drop forging and is provided with an opening 4 preferably of tapering square formation, as shown, and into which the squared end of the brake shaft is fitted. The body portion of the wheel hub member is relatively thick and near the top portion thereof is provided with an outwardly extending flange 5 having a flat upper face, to which latter the inner rim portions of the hand wheel sections are connected. The flange 5 is provided with a plurality of openings 6 adapted to receive the rivet connecting means, and arranged intermediate said opening are upwardly projecting ribs 7 preferably extending radially of the body portion of the hub to the edge of said flange. The ribs 7 are designed to engage mating portions provided on the complementary sections forming the brake wheel and provide an interlocking means between the hub member and said complementary sections which latter constitute the turning or hand gripping portions of the wheel, as will be understood.

Figure 8:
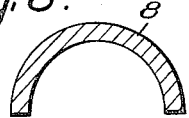
Figure 8 is a detail cross sectional view on the line 8—8 of Figure 1, through the hand gripping portion of the outer rim of the wheel.

The sections 1 and 2 shown in Figures 2 and 3 are pressed from metal plates, preferably of steel, and are blanked out to form the complementary wheel sections referred to. I have shown the wheel sections pressed in halves and adapted to be joined to the hub member and to each other, but it will be understood that the brake wheel may be pressed from a single plate, or may be formed in any desired number of sections to be subsequently connected together by rivets, bolts, welding or in any other approved manner. The complementary wheel sections 1 and 2 being of similar construction in the present embodiment of my invention, a description of but one section will be given. Each wheel section includes an outer rim portion 8 preferably pressed into semi-circular shape in cross section, as shown in Figure 8, said outer rim forming the hand gripping portion of the wheel. The inner rim portion 9 of the wheel is preferably flat, said inner rim being adapted to be connected to the upper face of the flange 5 by means of rivets 10. Overlaping joints are provided for the respective ends of the inner rim portions of the complementary sections, certain of the rivets 10 serving to firmly unite the overlapped rim portions to each other and to the flange of the hub member. The overlapping end portions are slightly offset to provide for a comparatively simple and neat joint, as shown.

Figure 7:
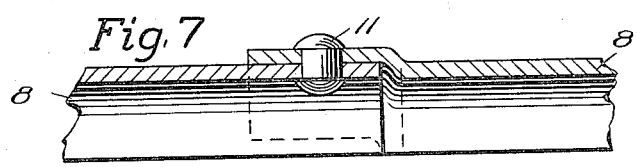
Figure 7 is a vertical sectional view on the line 7—7 of Figure 1, illustrating the joint and rivet means connecting the overlapping portions of the outer rim sections.
Figure 9:
Figure 9 is a detail cross sectional view on the line 9—9 of Figure 1, through one of the spokes uniting the outer and inner rim portions of the wheel.
Figure 6:
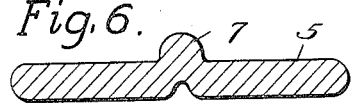
Figure 6 is a detail vertical sectional view on the line 6—6 of Figure 4, through a portion of the flange and projecting rib carried by the hub member.

The respective ends of the outer rims 8 of the complementary wheel sections are firmly united by means of rivets 11, said rivets passing through the overlapped portions of the rim, as clearly shown in Figure 7. The overlapped portions are preferably offset, thereby providing smooth and uniformly horizontal outer rim portions to be gripped by the hands when turning the wheel. The joints uniting the complementary wheel sections to each other and to the wheel hub member are preferably located upon a single diameter passing through the wheel, although the respective joints may be staggered or otherwise arranged as desired.

The inner and outer rim portions 8 and 9 of each complementary wheel section are united by spokes 12, each of said spokes being preferably reinforced by a corrugated portion shown in the form of a projecting rib 13 pressed upwardly from the blank. The rib portion of each spoke is located longitudinally and centrally thereof, it being obvious that a plurality of said ribs may be provided and their location changed as may be desired for effectively reinforcing the brake wheel. Each rib on said spokes forms a complementary portion for engaging the mating rib 7 on the hub member, interlocking means thereby being provided in conjunction with the connecting rivets for effectively joining the wheel sections and hub member together. The rib portions of the spokes preferably extend the full length thereof, as shown, said ribs acting to provide a vertical stiffness for the wheel.

The several parts of a hand brake wheel constructed in accordance with my present invention can be inexpensively manufactured and easily assembled, the rim portions of the complementary wheel sections being preferably first united, and said sections then positioned upon the upper face of the flange 5, rivets or other means connecting said wheel sections to the hub. The interior wall portions of each of the spoke ribs snugly fits over the projecting rib 7 of the hub member and assists the rivets in taking the shear forces incident to turning the wheel when applying the brakes.

Such changes in construction and assembly as properly fall within the scope of my invention may be made and I do not wish to be understood as limiting the brake wheel to the particular form of complementary sections and attaching means therefor, shown and described.

I claim:

1. The combination with a brake shaft hub member, of a hand brake wheel formed of pressed complementary metal sections, each having an outer rim portion forming a hand grip and an inner hub attaching portion, spoke members uniting said portions of each complementary section, and rivet means rigidly connecting said sections.

2. The combination with a brake shaft hub member, of pressed metal hand brake wheel sections each comprising an outer rim portion adapted to be gripped by the hand and an inner rim portion, means connecting said inner rim portion of each section to said hub member and to each other, and means connecting the outer rim portions of said brake wheel sections.

3. The combination with a brake shaft hub member, of pressed metal hand brake wheel sections formed with inner and outer rim portions, spokes uniting said rim portions, rivet means connecting the respective inner rim portions of said sections to the hub member, and rivet means uniting the respective outer rim portions of said sections.

4. The combination with a brake shaft hub member, of pressed metal hand brake wheel sections, one of said sections having a portion adapted to overlie an adjacent portion of another section on a single diameter passing through said wheel, and rivet means rigidly connecting said overlying portions of said sections.

5. The combination with a brake shaft hub member, of a pressed hand wheel comprising complementary metal sections, each section being formed with inner and outer rim portions arranged to overlap similar mating portions of the adjacent section, means adapted to engage and interlock said hub member and inner rim portions, and means connecting the respective inner and outer rim portions of said complementary sections.

6. The combination with a wheel hub having a flange, of a pressed metal hand wheel having inner and outer rim portions, the outer rim portion being semi-circular in cross section and the inner rim portion being relatively flat and adapted to be connected to said flange, means connecting said inner and outer rim portions, and interlocking means connecting said pressed metal hand wheel and hub.

7. The combination with a wheel hub, of a relatively light pressed metal hand wheel having outer and inner rim portions, means connecting said inner rim portion to said hub, and interlocking means provided between said pressed metal hand wheel and said hub for reducing the shearing strains on said connecting means.

8. The combination with a wheel hub, of a relatively light pressed metal hand wheel having inner and outer rim portions, reinforcing means connecting said rim portions, means connecting said inner rim portion to said hub, and means interposed between said hub and said reinforcing means for reducing the shear strains on the means connecting said inner rim portion with the hub.

9. A hand brake wheel including in combination a plurality of pressed metal sections each comprising an outer rim, an inner rim and corrugated spokes uniting said rims, and a wheel hub member to which each inner rim is attached, said hub member having portions adapted to engage the corrugations on said spokes.

10. A hand brake wheel including in combination a plurality of pressed metal sections, each of said sections comprising an outer rim, an inner rim and reinforced spokes uniting said rims, means connecting said outer rims of said metal sections, a wheel hub member and means attaching said inner rim portions to the wheel hub member, said means including a plurality of rivets and interlocking devices, said interlocking devices engaging the reinforced spokes and being arranged intermediate said rivet attaching means.

11. A hand brake wheel including in combination a plurality of pressed metal outer and inner rim sections, corrugated spokes uniting said sections, a wheel hub member, and means attaching said hub member to said inner rim sections, said means including a plurality of ribs adapted to engage the respective corrugations in said spokes.

12. A hand brake wheel including in combination a plurality of pressed metal outer and inner rim sections, spokes integrally uniting said sections, a wheel hub member, and means connecting said hub member to the inner rim section, said means including interlocking devices extending radially of the wheel and engaging said spokes.

13. A hand brake wheel including in combination a plurality of pressed complementary metal sections, each section comprising outer and inner rim portions, and a plurality of corrugated spokes integrally uniting said rim portions, rivet means connecting said sections together, a wheel hub member connected to the inner rim portions by some of said rivets, and means carried by said wheel hub member adapted to engage the corrugations in said spokes, said means serving to reduce the shear strains on the rivets and connecting said inner rim portions of the complementary sections to the wheel hub member.

14. A pressed metal hand brake wheel including in combination a hand gripping portion of semi-circular cross section, a relatively flat inner rim portion, a brake shaft hub member provided with an annular flange having a flat face, means connecting said inner rim portion to said flat face, and means interlocking said inner rim portion to said flange for reducing the shear strains on the aforesaid means connecting the inner rim portion to the flange.

15. A pressed metal hand brake wheel including in combination, a relatively light hand wheel having outer and inner rim portions, a plurality of ribbed spokes adapted to unite said rim portions, a hub member having complementary ribs engaging said ribbed spokes, and means interlocking said ribbed spokes with the ribs of said hub member.

16. A pressed metal hand brake wheel including in combination, a relatively light hand wheel having outer and inner rim portions, means uniting said rim portions, said means including a ribbed reinforced portion, and a hub member having a complementary rib portion adapted to engage said first named rib portion.

17. A pressed metal hand wheel comprising a hand gripping section having a plurality of radially disposed grooves, a hub member, and means carried by said hub member adapted to be fitted within the grooves of said hand gripping section for rigidly connecting the hub member thereto.

18. A pressed metal hand wheel comprising a hand gripping section having a series of grooves forming recesses, a hub member, and means rigidly connecting said hub member and hand gripping section, said means projecting from the upper surface of the hub member and being adapted to fit within the recesses of the hand gripping section, said means serving to uniformly resist shear strains incident to the turning of the wheel.

In testimony whereof I affix my signature.

BYERS W. KADEL.